United States Patent [19]

Becker et al.

[11] Patent Number: 4,666,164
[45] Date of Patent: May 19, 1987

[54] METHOD AND MEANS FOR SEALING WITH HEAT-RECOVERABLE FOAM LAYER

[75] Inventors: Karlheinz Becker, Hamm; Bernd Gerlach, Darmstadt-Eberstadt, both of Fed. Rep. of Germany

[73] Assignee: Raychem GmbH, Fed. Rep. of Germany

[21] Appl. No.: 767,926

[22] Filed: Aug. 21, 1985

[30] Foreign Application Priority Data

Aug. 22, 1984 [GB] United Kingdom ............... 8421357

[51] Int. Cl.⁴ ............... F16J 15/06; F16L 5/02; B29D 27/00; B29C 25/00
[52] U.S. Cl. ............................ 277/22; 277/1; 277/26; 277/228; 277/901; 174/152 R; 264/321; 264/345; 428/317.3; 428/318.4
[58] Field of Search ............ 277/1, 22, 26, 227, 277/228, 233, 901; 138/89; 174/65 SS, 20, 152 R; 29/447, 450, 451, DIG. 1, DIG. 13, DIG. 24; 264/321, 345; 428/217.1, 317.3, 318.4, 318.6

[56] References Cited

U.S. PATENT DOCUMENTS

| | | |
|---|---|---|
| 3,420,363 | 1/1969 | Blickensderfer ............... 264/321 X |
| 3,439,406 | 4/1969 | Wallin ................... 277/1 X |
| 3,542,375 | 11/1970 | Renwick ................... 277/22 |
| 3,634,924 | 1/1972 | Blake et al. ............. 29/447 |
| 3,758,916 | 9/1973 | Wetmore ................. 264/321 X |
| 3,775,204 | 11/1973 | Thompson et al. ........... 277/228 X |
| 3,793,672 | 2/1974 | Wetmore .................. 174/152 R X |
| 4,095,044 | 6/1978 | Horsma et al. ............ 277/26 X |
| 4,347,018 | 8/1982 | Wrightson ............... 29/451 X |
| 4,355,664 | 10/1982 | Cook et al. .............. 138/89 X |
| 4,431,198 | 2/1984 | Beinhaur et al. .......... 277/1 |

FOREIGN PATENT DOCUMENTS 48-25741 7/1973 Japan ..................... 277/26

*Primary Examiner*—Robert S. Ward
*Attorney, Agent, or Firm*—Ira D. Blecker; T. Gene Dillahunty

[57] ABSTRACT

An aperture, for example a duct having a cable passing through it, is sealed by installing a laminate, comprising an adhesive layer, a heater layer, and a heat-recoverable foam layer, the thickness of which increases on heating, into the gap between the duct wall and the cable with the adhesive layer facing both the wall and the cable. On energizing the heater, the foam increases in thickness and forces the adhesive into sealing engagement with the wall and cable.

16 Claims, 5 Drawing Figures

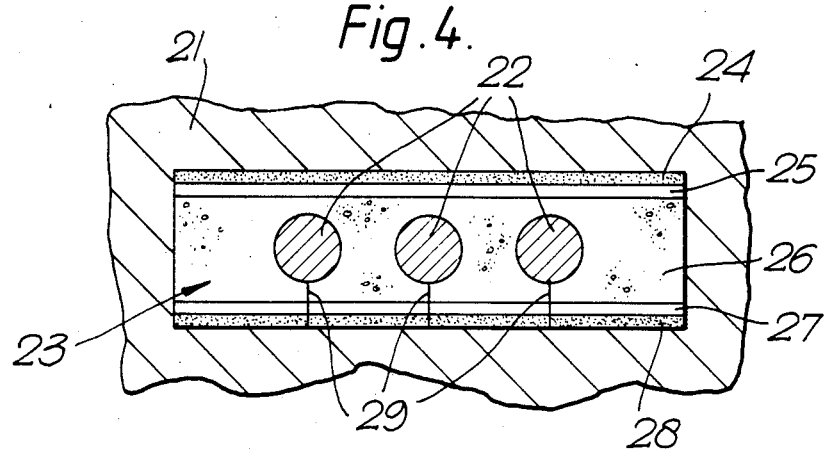
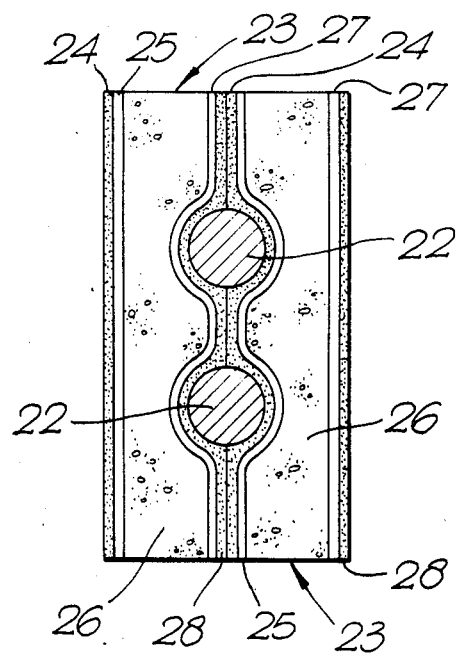

METHOD AND MEANS FOR SEALING WITH HEAT-RECOVERABLE FOAM LAYER

FIELD OF THE INVENTION

This invention relates to sealing, and especially to sealing an aperture, more especially a space between an elongate substrate and an aperture adjacent to the elongate substrate.

BACKGROUND OF THE INVENTION

An example of such seal is a duct seal, where a seal is needed between a cable, for example, and a wall, or bulkhead, duct through which it passes, to prevent moisture or other contaminants travelling along the duct. A further type of duct seal is one in which a duct designed to carry a cable is empty, and it is necessary to block off the duct completely until the cable is installed.

The reason that a seal (rather than an adhesive bond of no significant thickness) is required in the first instance is a disparity in size or shape between the aperture surface and that of the elongate substrate or substrates. For example, a duct may be from several millimeters to several centimeters greater than the cable it carries.

Such seals have usually been formed by the use of a conformable sealing member, for example an O-ring, or the use of a mass of a sealant or hot-melt adhesive. Whilst these seals in general work in a satisfactory manner, problems sometimes occur. For example, by their nature, conformable sealing members have a low modulus and, especially where they are used to fill large voids, have a tendency to creep over extended periods of time. Leak paths may result which permit, for example, ingress of moisture to a sensitive area.

It has been proposed, in British Specification No. 1,485,621, to pump foamable material into a duct to fill the space between the cable or cables and the duct. Since, however, the foamable material is not in any way constrained against penetration of the duct, much material may be consumed before the duct is closed, with resulting waste both of time and material, and leak paths that interface between the foamed material and the duct are possible and difficult to detect.

There accordingly remains a need for a method and device to seal ducts and similar apertures, whether carrying an elongate substrate or not.

DESCRIPTION OF THE INVENTION

The present invention provides a laminate comprising a layer of sealant or adhesive, advantageously heat-activatable, a flexible heater layer, and a layer of heat-recoverable material having interstices therein, the direction of recovery being such as to cause an increase in the thickness of the layer.

The present invention also provides a method for sealing an aperture, which method comprises installing in the aperture a laminate comprising a sealant or adhesive layer, advantageously heat-activatable, a flexible heater, and a heat-recoverable layer having interstices therein, the direction of recovery being such as to increase the thickness of the layer, the laminate being installed with the sealant or adhesive layer facing the wall of the aperture and advantageously any substrate present within the aperture, and energizing the heater to cause the layer to increase in thickness and the sealant or adhesive layer to make sealing or adherent contact with the aperture wall and advantageously to any substrate present.

In a preferred method, the laminate is initially in sheet form and is folded into a generally U-shaped form, with the adhesive or sealant layer on the outside, then formed into a closed loop with one U-shaped end tucked into the opposite U-shaped end, and installed in the aperture. When the aperture is a duct, the arms of the U advantageously are installed to face outward, the base of the U then facing toward the interior of the duct.

The sealant or adhesive will be chosen bearing in mind the surface or surfaces with which it is to bond. Since, at least when a duct is to be sealed, the space available for installation of the laminate is normally very limited, it is desirable that the layer be such as not to bond prematurely to the surface of the aperture to be sealed. The layer may be solvent-activated but, because of a number of hazards associated with solvents, e.g., toxicity and flammability, this is at present not preferred.

The sealant or adhesive layer may be a mastic, but is advantageously a hot-melt adhesive or other heat-activatable material. The free surface of the layer may be rendered non-tacky if necessary by the use of a release layer, or a powder such as talc, or a layer of anti-tack coating, for example as described in U.S. Pat. No. 3,415,287, the disclosure of which is incorporated by reference herein, which coating dissolves in or forms a single phase with the sealant or adhesive on heating.

The heater is advantageously an electrical heater, although other means, for example, a layer comprising the reactants for an exothermic chemical, physical, or physicochemical reaction, may be employed. As indicated above, the heater is flexible, and is advantageously also deformable, that is, capable of being changed in surface area and shape without a significant tendency to return to its original configuration. As an example of a suitable heater layer, there may be mentioned that described in British Specification No. 1,569,161, the disclosure of which is incorporated by reference herein. Briefly, such a heater comprises a layer composed of an electrically conductive polymeric composition and laminar flexible electrodes on opposite faces of the layer, with staggered slits extending through the whole heater from one face to the other. At least one of the dimensions of the layer may be changed, the slits opening out to allow this without loss of electrical continuity either in the electrodes or the conductive composition.

The layer of heat-recoverable material having interstices therein is advantageously a layer of heat-recoverable foam, and will be referred to as such for convenience. As pointed out in U.S. Pat. No. 3,758,916, the disclosure of which is incorporated by reference herein, in order for change in one dimension of a heat-recoverable article to take place without necessarily involving a change in other dimensions, the article should have a compressible fluid portion therein. This compressible portion is advantageously provided by the cells of a foamed material, but may in principle be provided by drilling, molding or otherwise forming holes in the material. However, it is presently preferred that, for the purposes of the present invention, the layer be of a foamed thermoplastic material that has been, cross-linked, by chemical means or by irradiation, and compressed to reduce its thickness while heated, and cooled while compressed. Such a layer will remain in its compressed form at room temperature but on being heated to a certain temperature, the recovery temperature, will return, or attempt to return, to its original thickness. This tendency to increase in thickness on heating provides the driving force which, in the laminate of the present invention, causes the sealant or adhesive layer to make proper contact with the walls of the aperture and any substrate therein, and seal the aperture.

The recovery temperature of the foamed layer and the activation temperature of the sealant or adhesive if it is heat-activated may be so chosen that the adhesive is activated before, during, or after recovery, but are preferably such that the adhesive is activated by the time contact under the pressure of recovery is made with the aperture wall.

The laminate of the invention advantageously has the layers in the order stated, especially if the sealant or adhesive is heat-activated, as is presently preferred, since the heater is then in direct contact both with the foam layer and the sealant or adhesive layer. It is within the scope of the invention, however, for the layers to be ordered otherwise, provided that the sealant or adhesive layer is able to contact the aperture to be sealed. It is also within the scope of the invention for the laminate to include other layers other than those specified above. In some embodiments, it may be desirable to include more than one of the specified layers; for example there may be provided a sandwich structure of sealant or adhesive/heater/foam/heater/sealant or adhesive. In other embodiments of the method, it may be desirable to use two or more laminates, as will be described below.

It is desirable that there be little or no relative movement between the surfaces of advacent layers, so that the laminate maintains its structural coherence during storage and installation and to this end the layers may be appropriately bonded together. There may, of course, be relative movement between the sealant or adhesive layer and the heater when the latter activates the former, but the adjacent surfaces of the foam and heater layers desirably remain relatively fixed.

BRIEF DESCRIPTION OF THE DRAWINGS

The invention will now be described in greater detail by way of example only with reference to the accompanying drawings, in which:

FIG. 4 is an end view of a rectangular duct containing a second form of laminate constructed in accordance with the invention, after recovery; and FIG. 5 is an end view of a rectangular duct containing two of the second form of laminate constructed in accordance with the invention, after recovery of both laminates.

DESCRIPTION OF PREFERRED EMBODIMENTS

Figure 1:
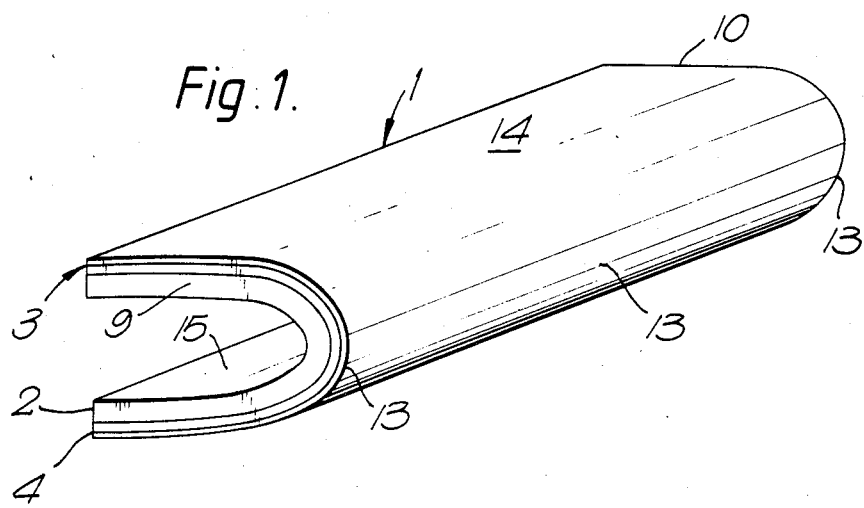
FIG. 1 is an isometric view of one form of laminate constructed in accordance with the invention.
Figure 2:
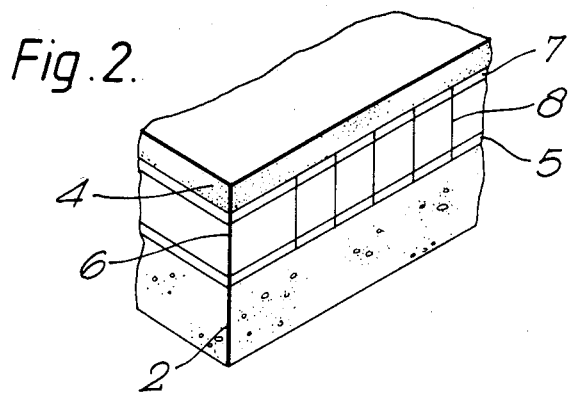
FIG. 2 is an enlarged view of a corner portion of the laminate of FIG. 1, showing the layers in more detail.

Referring now to the drawings, and more especially FIGS. 1 and 2, a laminate, indicated generally by the reference numeral 1, comprises a foam layer 2, a heater layer indicated generally by the reference numeral 3, and an adhesive layer 4. The heater layer 3 comprises a first layer electrode 5, a conductive polymeric composition 6 and a second layer electrode 7 (see FIG. 2). Slits 8 extend through the whole thickness of the heater layer 3. These slits are arranged in a staggered overlapping configuration, as described in more detail in the above-mentioned British Specification No. 1,569,161. It will be appreciated that the slits in the heater may be oriented parallel to the laminate end 9 shown in FIG. 1, transverse thereto, or diagonally thereto, depending on the direction in which most deformation is to take place in the intended use of the laminate, and that in many uses, for example that described below with reference to FIG. 4, will not be necessary at all. It will also be appreciated that the heater layer 3 has leads, not shown, attached to the layer electrodes 5 and 7 for connection to a source of electrical potential and that the edges, at least, of layer 3 may in practice be electrically insulated.

Figure 3:
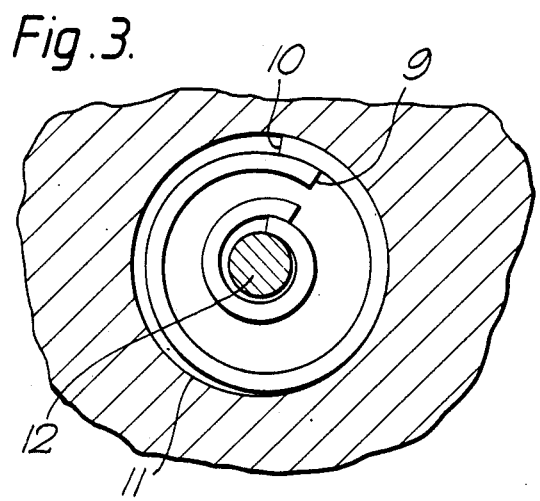
FIG. 3 is an end view of a duct containing the laminate of FIG. 1 installed therein prior to recovery.

In FIG. 1, the laminate 1 is shown folded from its original flat state into a U-shaped configuration, so that there are two opposed U-shaped ends 9 and 10. Referring now more especially to FIG. 3, for application to a duct 11 containing a single cable 12, the laminate 1 is formed into a closed loop with one end 9 tucked into the other end 10, and inserted into the duct 11 with the base 13 (see FIG. 1) of the U facing into the duct. It will be appreciated that only the leg portions 14, 15 of the U are in contact with the wall of the duct 11 or the cable 12, and that there is a portion at the base 13 of the U not in contact with either. This is the case also after recovery of the laminate, and gives the installed seal the flexibility to accommodate some relative movement between the cable and the duct without losing the integrity of the seal.

When the laminate 1 has been installed in the desired position in the duct 11, the heater is energized, which causes the foam layer 2 to expand on recovery and the opposed portions thereof in the legs 14, 15 of the U to come into contact and push the adhesive layer 4 which has just previously been activated by the heat into sealing contact with the duct 11 and the cable 12. During and after cooling the resilience of the foam layers pressing against each other maintains pressure on the adhesive layer to maintain a secure seal.

In cases where the duct contains no cable, the laminate shown in FIG. 3 may be chosen to be of such a size that the layer of adhesive on the inner arm of the U contacts and bonds to itself on recovery of the foam. Alternatively, there may be provided a "dummy" length of cable for insertion within the open central portion of the looped laminate; this dummy length of cable is advantageously provided with a handle or grip to facilitate its proper positioning in the central portion. With this embodiment especially, but also with other embodiments, it will be appreciated that if certain types of heat-activated adhesive or sealant are employed, e.g., a hot-melt adhesive, the duct seal may readily be removed by simply again energizing the heater layer to soften the adhesive. The handle or grip facilitates such removal also. It may even be possible to substitute, in the-present case, a newly installed cable for the dummy cable, especially if access to the other end of the duct is possible. Otherwise, it is a simple matter to remove the existing seal and replace it by a new one.

Referring now more especially to FIG. 4, there is shown a rectangular duct 21 containing three cables 22, the duct being sealed by a recovered laminate indicated generally by the reference numeral 23, which comprises a first adhesive layer 24, a first heater layer 25, a foam layer 26, a second heater layer 27 and a second adhesive layer 28. The layers are as described with reference to FIGS. 1 and 2, except that three slits 29 are cut through the second heater layer 27 and the adhesive layer 28, and part way through the foam layer 26, to allow installation of the laminate 23 around the cables 22. The heat layer 27 is divided into four sections by this procedure but, since current passes through the layered heater 27 across the thickness of its layers, it is only necessary to ensure connecting leads (not shown) are attached to all four sections to activate the heater. This is readily achieved where, as is preferred, a continuous bus conductor is provided along each edge of the electrodes.

The embodiment shown in FIG. 5, where like reference numerals to those of FIG. 4 for like parts, is similar to that of FIG. 4, except that two laminates 23 are used, so an adhesive surrounds each cable 22 to ensure sealing around them. In this arrangement the slits 29 are not necessary, and in practice the contacting adhesive layers of the two laminates would fuse to form an integral layer. If, in the embodiments shown in FIGS. 4 and 5, it is necessary to provide sealing at the two edges of the rectangular ducts that are shown as being in contact with foam, this can be achieved using a longer length of laminate and cutting and folding it to provide a layer of adhesive in contact with the duct. This may not be necessary where, for example, the aperture is in a dividing wall and the seal is acting as a wall feed through, primarily to prevent, for example, smoke transmission from one region to another in the event of a fire.

What we claim is:

1. A laminate comprising a layer of sealant or adhesive, a flexible heater layer, and a layer of heat-recoverable material having interstices therein, the direction of recovery being such as to cause an increase in the thickness of the layer.

2. A laminate as claimed in claim 1, wherein the sealant or adhesive is heat-activatable.

3. A laminate as claimed in claim 2, wherein the temperature of activation and the temperature of recovery are so related that, when the heater is energized, the sealant or adhesive is activated by the time the increase in thickness of the heat-recoverable layer takes place.

4. A laminate as claimed in claim 3, wherein the heater is an electrical heater.

5. A laminate as claimed in claim 4, wherein the heater comprises a layer of an electrically conductive polymeric composition having laminar electrodes on opposite faces thereof.

6. A laminate as claimed in claim 5, wherein the heater layer has staggered slits extending through the whole thickness thereof.

7. A laminate as claimed in claim 6, wherein the heat-recoverable material is a foam.

8. A laminate comprising, in the following order, a layer of sealant or adhesive, a flexible heater layer, and a layer of heat-recoverable material having interstices therein, the direction of recovery being such as to cause an increase in the thickness of the layer, and wherein the heater layer has staggered slits extending through the whole thickness thereof.

9. A laminate as claimed in claim 8, which comprises, in the order specified, a sandwich structure comprising a layer of sealant or adhesive, a heater layer, a foam layer, a heater layer, and a layer of sealant or adhesive.

10. A laminate as claimed in claim 9, wherein the foam layer is heat-recoverable material.

11. A method for sealing an aperture, which method comprises installing in the aperture a laminate as specified in claim 1, the laminate being installed with the sealant or adhesive layer facing the wall of the aperture, and energizing the heater to cause the layer to increase in thickness and the sealant or adhesive layer to make sealing or adherent contact with the aperture wall.

12. A method as claimed in claim 11, wherein there is a substrate in the aperture, and the sealant or adhesive layer also faces the substrate on installation.

13. A method as claimed in claim 12, wherein the laminate is initially a sheet, and is folded into a generally U-shaped form, with the adhesive or sealant layer on the outside, then formed into a closed loop with one U-shaped end tucked into the other U-shaped end, and is so installed in the aperture.

14. A method as claimed in claim 13, wherein the aperture is a duct, and the loop is installed in the duct with the base of the U facing towards the interior of the duct.

15. A method as claimed in claim 14, wherein the substrate is a cable.

16. A method as claimed in claim 14, wherein heat-recoverable material is a foam.

* * * * *